United States Patent
Subbarao et al.

(10) Patent No.: US 12,498,885 B2
(45) Date of Patent: Dec. 16, 2025

(54) METHODS AND SYSTEMS FOR IMPLEMENTING STREAM DATA UPDATES

(71) Applicant: SK Hynix NAND Product Solutions Corp., Rancho Cordova, CA (US)

(72) Inventors: Sanjay Subbarao, Irvine, CA (US); Sriram Natarajan, Folsom, CA (US); Weng-Chin Yung, Folsom, CA (US); Swapna Galireddy, Folsom, CA (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 0 days.

(21) Appl. No.: 18/511,670

(22) Filed: Nov. 16, 2023

(65) Prior Publication Data

US 2025/0165182 A1    May 22, 2025

(51) Int. Cl.
*G06F 3/06* (2006.01)

(52) U.S. Cl.
CPC .......... *G06F 3/0659* (2013.01); *G06F 3/0613* (2013.01); *G06F 3/064* (2013.01); *G06F 3/0673* (2013.01)

(58) Field of Classification Search
CPC ...... G06F 3/0659; G06F 3/0613; G06F 3/064; G06F 3/0673
See application file for complete search history.

(56) References Cited

U.S. PATENT DOCUMENTS

| | | | |
|---|---|---|---|
| 2013/0262035 A1* | 10/2013 | Mills ................ | G06F 16/24568 702/188 |
| 2015/0186270 A1* | 7/2015 | Peng ..................... | G11C 16/16 711/3 |
| 2017/0277476 A1 | 9/2017 | Shin | |
| 2018/0150257 A1* | 5/2018 | Griffith ................ | G06F 3/0626 |
| 2019/0102083 A1 | 4/2019 | Dusija et al. | |
| 2019/0377494 A1 | 12/2019 | Rao et al. | |
| 2021/0096772 A1 | 4/2021 | Lee | |
| 2021/0333996 A1 | 10/2021 | Gorobets et al. | |
| 2024/0028230 A1* | 1/2024 | Bert ........................ | G06F 3/064 |

* cited by examiner

*Primary Examiner* — Eric Cardwell
(74) *Attorney, Agent, or Firm* — Haley Guiliano LLP

(57) ABSTRACT

In accordance with some embodiments of the present disclosure, a method is performed on a memory storage device for updating data stored in the memory storage device. The method includes writing a first stream data to a first portion of memory, wherein the first stream data includes a plurality of substreams, and writing first additional data to a second portion of memory, wherein the first additional data includes data indicative of an update of at least one substream of the first stream data and is no larger than a substream of the plurality of substreams of the first stream data. Concurrent with writing the first additional data, the method also includes writing second additional data to the second portion of memory, wherein the second additional data includes at least one of data indicative of an update of at least one substream of a second stream data, or non-stream data.

20 Claims, 5 Drawing Sheets

METHODS AND SYSTEMS FOR IMPLEMENTING STREAM DATA UPDATES

TECHNICAL FIELD

The present disclosure is directed to methods and systems for implementing stream data updates, including updates of stream data that is stored on a memory device.

SUMMARY

In accordance with the present disclosure, methods and systems are provided for updating stream data that is stored on a memory device. The methods and systems disclosed herein may improve the efficiency of utilizing the storage capacity of memory devices and accessing data stored thereon.

In accordance with some embodiments of the present disclosure, a method is performed by processing circuitry of a memory storage device for updating data stored in the memory storage device. The method includes writing a first stream data to a first portion of memory, where the first stream data includes a plurality of substreams, and writing first additional data to a second portion of memory, where the first additional data includes data indicative of an update of at least one substream of the first stream data and is no larger than a substream of the plurality of substreams of the first stream data. Concurrent with writing the first additional data, the processing circuitry writes second additional data to the second portion of memory, where the second additional data includes at least one of data indicative of an update of at least one substream of a second stream data, or non-stream data.

In some embodiments, the first additional data is smaller than every respective substream of the plurality of substreams of the first stream data.

In some embodiments, the method also includes reading the first and second portions of memory and reconciling the first stream data and the first additional data based on one or more stream IDs or logical block addresses associated with the first stream data and the first additional data, without modifying the second additional data stored in the second portion of memory.

In some embodiments, the second additional data includes data indicative of an update of at least one substream of a second stream data, and the method also includes writing the second stream data to a third portion of memory.

In some embodiments, the second additional data is no larger than a substream of a plurality of substreams of the second stream data.

In some embodiments, the method also includes reading the second and third portions of memory and reconciling the second stream data and the second additional data based on one or more stream IDs or logical block addresses associated with the second stream data and the second additional data, without modifying the first additional data stored in the second portion of memory.

In some embodiments, the method is performed in response to receiving one or more commands from a host device.

In some embodiments, each of the first portion of memory and the second portion of memory is an individually addressable erase unit.

In accordance with some embodiments of the present disclosure, a device includes memory and processing circuitry, and the processing circuitry is configured to write a first stream data to a first portion of the memory, where the first stream data includes a plurality of substreams, and to write a first additional data to a second portion of the memory, where the first additional data includes data indicative of an update of at least one substream of the first stream data and is no larger than a substream of the plurality of substreams of the first stream data. Concurrent with writing the first additional stream data, the processing circuitry is also configured to write second additional data to the second portion of the memory, where the second additional data includes at least one of data indicative of an update of at least one substream of a second stream data or non-stream data.

In some embodiments, the processing circuitry is also configured to write first additional data that is smaller than every respective substream of the plurality of substreams of the first stream data.

In some embodiments, the processing circuitry is also configured to read the first and second portions of the memory and reconcile the first stream data and the first additional data based on one or more stream IDs or logical block addresses associated with the first stream data and the first additional data, without modifying the second additional data stored in the second portion of the memory.

In some embodiments, the second additional data includes data indicative of an update of at least one substream of a second data stream, and the processing circuitry is also configured to write the second stream data to a third portion of the memory.

In some embodiments, the processing circuitry is also configured to write a second additional data that is no larger than a substream of data plurality of substreams of the second stream data.

In some embodiments, the processing circuitry is also configured to read the second and third portions of the memory and reconcile the second stream data and the second additional data based on one or more stream IDs or logical block addresses associated with the second stream data and the second additional data, without modifying the first additional data stored in the second portion of the memory.

In some embodiments, the device also includes a host device, and the processing circuitry is also configured to receive one or more commands from the host device and write at least one of the first stream data, the first additional data, or the second additional data in response to receiving the one or more commands.

In some embodiments, each of the first portion of memory and the second portion of memory is an individually addressable erase unit.

In accordance with some embodiments of the present disclosure, a non-transitory computer-readable medium has non-transitory computer-readable instructions encoded thereon that, when executed by processing circuitry, cause the processing circuitry to write a first stream data to a first portion of memory, where the first stream data includes a plurality of substreams, and to write a first additional data to a second portion of memory, where the first additional data includes data indicative of an update of at least one substream of the first stream data and is no larger than a substream of the plurality of substreams of the first stream data. Concurrent with writing the first additional data, the instructions also cause the processing circuitry to write second additional data to the second portion of memory, where the second additional data includes at least one of data indicative of an update of at least one substream of a second stream data or non-stream data.

In some embodiments, the instructions also cause the processing circuitry to write first additional data that is smaller than every respective substream of the plurality of substreams of the first stream data.

In some embodiments, the instructions also cause the processing circuitry to read the first and second portions of memory and reconcile the first stream data and the first additional data based on one or more stream IDs or logical block addresses associated with the first stream data and the first additional data, without modifying the second additional data stored in the second portion of memory.

In some embodiments, the second additional data includes data indicative of an update of at least one substream of a second stream data, and the instructions further cause the processing circuitry to write the second stream data to a third portion of memory, where the second additional data is smaller than every respective substream of the plurality of substreams of the second stream data.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, and/or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

DETAILED DESCRIPTION

Figure 1:
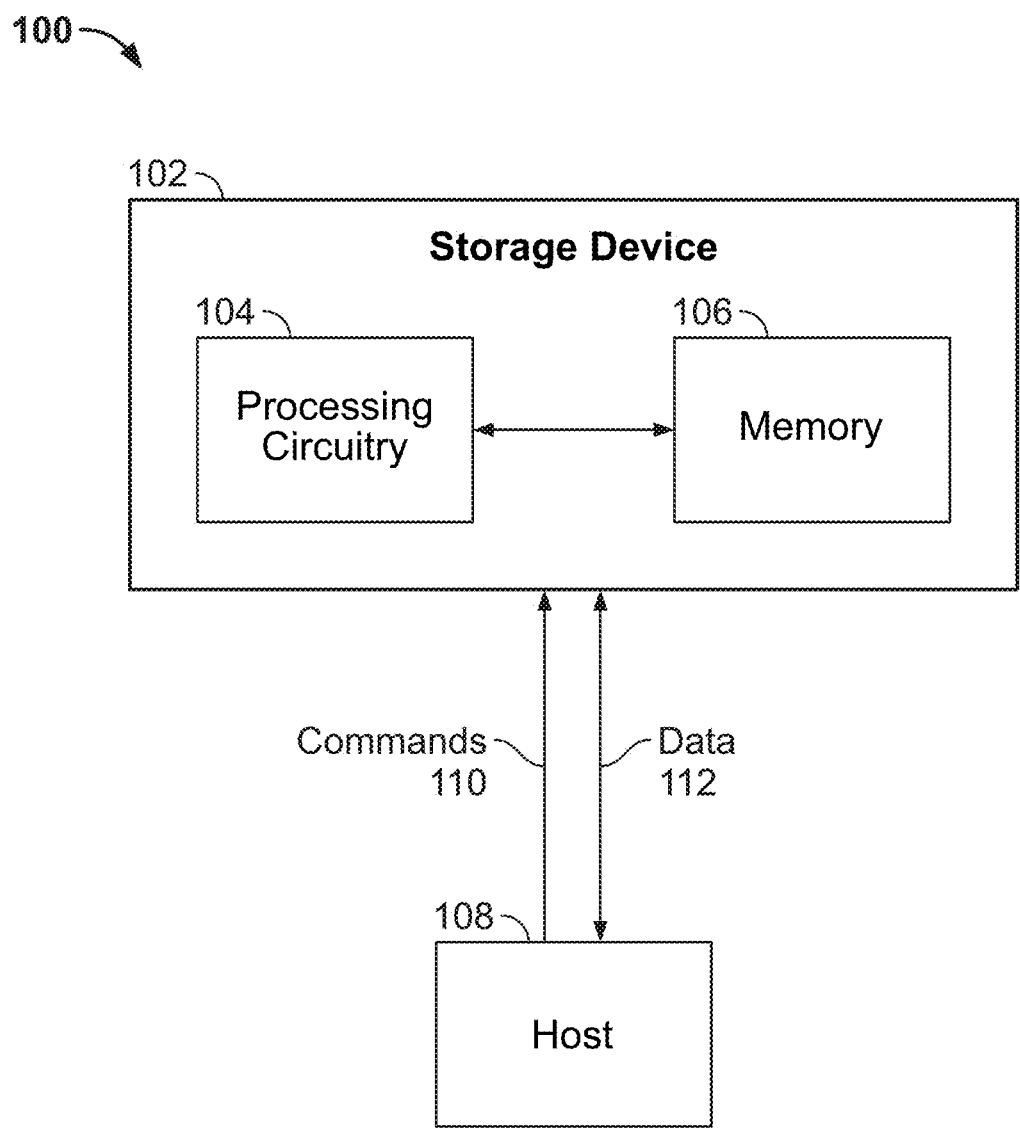
FIG. 1 shows a system including a storage device and a host, in accordance with some embodiments of the present disclosure.

Writing and reading data is integral to the operation of memory storage devices. Operational protocol specifications (e.g., NVM Express (NVMe)) are implemented to define how to read and write data to storage devices, such as a solid-state drive (SSD) device or any suitable storage device with non-volatile memory. The way in which storage devices write and read data affects the longevity and operating efficiency of the storage devices.

In some embodiments, data that the storage devices receive and process may include stream data or non-stream data. As used herein, stream data (e.g., video data, audio data, any data with a temporal component, or any combination thereof) refers to a data set. Stream data often, but not necessarily, has a sequential characteristic, i.e., it may be written and read in a predetermined order. The data within one or more stream data may be simultaneously trimmed or overwritten. The advantage of grouping data into stream data and later writing the stream data into one or more respective superblock (or erase unit) is that when such stream data gets invalidated (e.g., by a trim, overwrite, other suitable operation, or any combination thereof) the entire superblock thereafter contains invalid data that can be erased without any garbage collection. This procedure results in a significant reduction of write amplification (WA). As used herein, non-stream data (e.g., metadata, command data, any data without a temporal component, or any combination thereof) may refer to data that does not have a sequential characteristic, i.e., it can be written and read in any order.

Stream data may occupy a large amount of memory, making stream data management an important aspect of memory storage device operations. As part of such stream data management, stream data may include one or more first units, each first unit of a given stream granularity size (SGS) (e.g., 1 MB, 4 MB, 8 MB, 32 MB, 256 MG, 1 GB, or any other suitable size). Each SGS may include multiple second units, each second unit of a given stream write size (SWS) (e.g., 32 KB, 48 KB, 192 KB, or any other suitable size). Each respective SGS or SWS unit, or multiple units thereof, may be referred to as a substream of a complete stream data.

Stream data may be written to one or more physical memory units, and each such memory unit may be denoted as a superblock. In some embodiments, each superblock may be an erase unit (e.g., a portion of memory that may be individually erased). In some embodiments, the stream data is partitioned into SGS units that may be sized equal to the memory storage capacity of a superblock. The system and methods disclosed herein may include a host that is communicatively coupled to the storage device and may be configured to read, write, and erase a portion of superblock data, the portion of superblock data of varying size depending on the type of operation (e.g., read, write, erase). For example, a host may be configured to write and read a portion of superblock data with a minimum size that is less than or equal to the SWS but may be configured to erase a portion of superblock data with a minimum size greater than or equal to the SGS.

In some embodiments, a host (e.g., a host device) coupled to the memory storage device is configured to concurrently write multiple streams of stream data (e.g., 1, 2, 4, 8, 16, or any other suitable number of streams) to multiple sets of one or more superblocks, with each respective set of the superblocks corresponding to one respective stream of the stream data. As used herein, the term concurrent may refer to the simultaneous manner in which operations are performed in time (e.g., occurring in the same clock cycle), or it may refer to the coordinated and sequential manner in which operations are performed as part of a single process (e.g., a single process may queue multiple operations and then execute these operations in sequence, after which the process is completed).

After stream data is written to one or more superblocks, this data may need to be updated. While it may be desirable to update such stream data by writing new data over the existing stream data, certain types of physical memory storage (e.g., NAND flash memory) may not have the capabilities to overwrite existing stream data stored in memory. Instead, new data may only be written to occupied memory cells through an erase and rewrite procedure. Therefore, a stream data update (i.e., new data that is indicative of an update of a substream of existing stream data stored at a first superblock of memory) may be written to a second superblock that is separate from the first superblock containing the existing stream data. In some embodiments, the stream data update may be smaller than an SWS of the corresponding existing stream data (e.g., a stream data update size may be 4 KB). In particular, the size of the stream data update may be characterized by an update frequency, which may be determined based on a ratio of a stream data update size to a superblock size.

When writing a stream data update with a small update frequency (e.g., 1-10%, or less) to a superblock, certain operational specifications (e.g., NVMe) lack efficient protocols. For example, NVMe contains a specification for writing such a stream data update to an empty superblock, a process which may cause a large amount of stranded capacity (e.g., >99% of the dedicated superblock does not store data) and/or overprovisioning. The NVMe also contains a specification for directly incorporating the updated stream data into the existing stream data through a computationally expensive read-modify-write (RMW) procedure that causes a very high WA. For example, in an illustrative high WA operation, the RMW procedure may cumulatively write 100s of MBs of data in order to ultimately encode a stream data update size of only 4 KB. Such high WA operations degrade the service lifetime of physical memory units of the storage device.

In accordance with the present disclosure, methods and devices are provided for computationally efficient updates of stream data. In some embodiments, a first stream data is written to a first set of one or more superblocks. Later, this first stream data requires an update that is contained in a first set of additional data. This first additional data is written to a new superblock, which is separate from the one or more superblocks storing the first stream data. When the superblock size is equal to an SGS of the first stream data, and the first additional data is smaller than the SWS of the first stream data, this new superblock may retain substantial unused capacity after receiving the first additional data. In response, a second set of additional data may be written to the new superblock to utilize its unused capacity and improve the overall operational efficiency.

The second additional data is not associated with the first stream data or the first additional data but is nonetheless written to the same superblock to more efficiently utilize physical memory cells. This second additional data may contain one or more updates of other existing stream data (e.g., an update of a second, third, or fourth data stream, an update of any additional data stream, or any combination thereof) may be non-stream data (e.g., host data), or may be any combination thereof. In some embodiments, the second additional data is written concurrently with the first additional data. In some embodiments, the second data stream (and any additional data streams that the second additional data update) is written concurrently with the first data stream.

Following the abovementioned series of writes, the first additional data must ultimately be reconciled with the first stream data. Thus, the superblock containing the first additional data and the set of one or more superblocks containing the first stream data are read and reconciled based on parameters associated with these respective superblocks. For example, a stream ID or a logical block address (LBA) for each of the respective superblocks may be used to reconcile the first and second stream data. In some embodiments, the first data stream and the first additional data may have the same stream ID. During data reconciliation, the second additional data stored in the new superblock containing the first additional data is not modified. Similarly, this second additional data may be read without modifying the first additional data or any other data stored in the new superblock.

The subject matter of this disclosure is further discussed with reference to FIGS. 1-5.

FIG. 1 shows a system 100 that includes a storage device 102 that is communicatively coupled to a host 108, in accordance with some embodiments of the present disclosure. Storage device 102 includes processing circuitry 104 and memory 106. Storage device 102 is configured to receive commands 110 from host 108 and to exchange data 112 with host 108. For example, data 112 includes stream data, updates thereof, and non-stream data (e.g., host data). Logical rules and protocols for operating storage device 102 and host 108 may be established by certain operational specifications (e.g., NVMe, any other suitable transport protocol specifications, or any combination thereof).

Host 108 is configured to read, write, and erase data (e.g., data 112) on storage device 102. In some embodiments, such data operations are aligned with SWS and/or SGS boundaries (e.g., the minimum possible size of a write corresponds to an SGS or SWS associated with the write), as further described below. In some embodiments, such data operations are aligned with an erase unit and/or superblock size. An operation (e.g., read, write, or erase) may be performed in response to commands 110, and SWS and SGS parameters may be identified according to commands 110. In some embodiments, commands 110 may be any one of directive receive commands, directive send commands, and any other suitable commands, or any combination thereof. For example, a write command may include a directive type (e.g., stream data) and data specific to the directive (e.g., a stream ID or LBA). In some embodiments, host 108 may concurrently write multiple streams of stream data to storage device 102.

In some embodiments, storage device 102 is an SSD device. An SSD device is a data storage device that uses integrated circuit assemblies as memory to store data persistently. SSDs have no moving mechanical components, and this feature distinguishes SSDs from traditional electro-mechanical magnetic disks, such as hard disk drives (HDDs) or floppy disks, which contain spinning disks and movable read/write heads. Compared to electromechanical disks, SSDs are typically more resistant to physical shock, run silently, have lower access time, and less latency. SSDs use indirect memory addressing, which stores data into a next available physical memory address and maps the next available physical memory address to the logical memory address within an indirection table. In some embodiments, SSDs store data using non-volatile flash memory cells.

When storage device 102 includes non-volatile flash memory cells, certain operational specifications (e.g., NVMe) present limitations to executing rapid and efficient updates to stream data. For example, host 108 cannot issue a command 110 to overwrite existing stream data stored in non-volatile flash memory cells. Moreover, host 108 may only be configured to delete the existing stream data with coarse precision (e.g., the size of an erasure of the existing stream data stored in memory may be no less than that of an SGS or a superblock). Therefore, to execute certain operations, including making updates to the existing stream data, host 108 may be forced to execute an inefficient process of data RMW. The inefficiency of such an update operation may be quantified according to a write amplitude (WA), which may be determined based on the ratio of the size of updated data (e.g., in KB) to the amount of data that is physically written to incorporate the updated data into existing data (e.g., in MB or GB). High WA values correspond to slow operation speeds of storage device 102, reduce its longevity, and incur unnecessary power consumption. Thus, in accordance with embodiments of the present disclosure, methods and systems are provided for reducing the WA when storing data indicative of an update of existing data.

Figure 2:
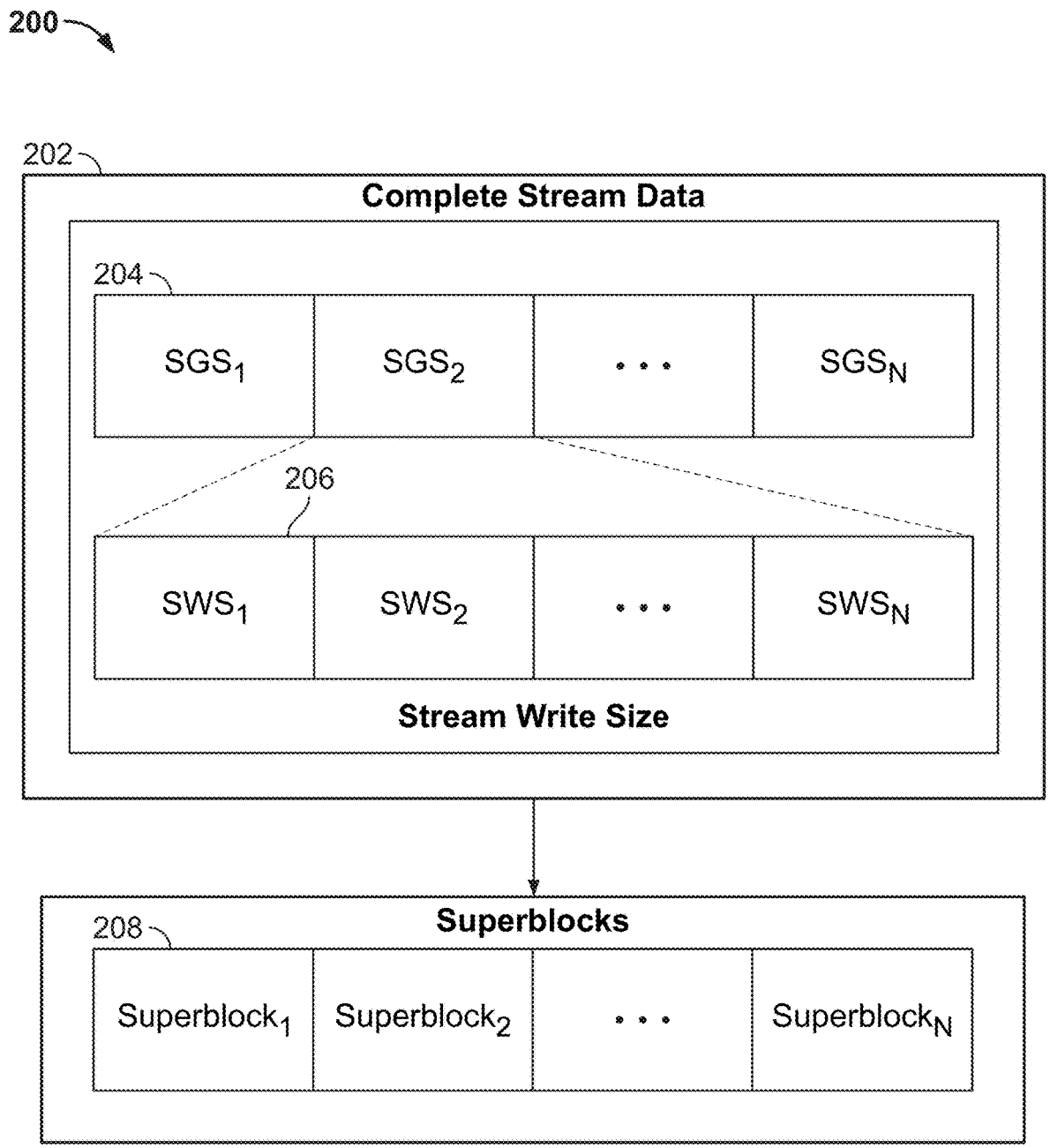
FIG. 2 shows an illustrative stream data and a superblock of memory in a storage device, in accordance with some embodiments of the present disclosure.

FIG. 2 shows a complete stream data 202 containing multiple larger memory storage units SGS 204 and multiple smaller memory storage units SWS 206, in accordance with some embodiments of the present disclosure. Either of one or more respective SGS 204 or one or more respective SWS 206 may be referred to as a boundary or substream of complete stream data 202. In some embodiments, the size of a respective SGS 204 corresponds to that of a superblock (e.g., an individually addressable area of physical memory units) or an erase unit (e.g., an individually erasable area of physical memory units). Each SGS 204 is discretized into one or more SWS 206. For example, an SWS unit size may correspond to the size of a tri-level or quad-level memory cell (e.g., 48 KB, 64 KB, or any other cell-level size), and an SGS unit size may correspond to a much larger size (e.g., from 100 MB to 1 or more GB). In some embodiments, certain memory storage operations (e.g., reading and writing data) may occur at the smaller size of an SWS 206, whereas other memory storage operations (e.g., erasing data) may occur at the larger size of an SGS 204. Each complete stream data 202 may be physically mapped to one or more superblock 208, where the given number of superblocks (i.e., Superblock$_N$) corresponds to the size of complete stream data 202.

In some embodiments (e.g., as per NVMe specifications), each respective set of one or more superblock 208 may only encode a single complete stream data 202. In some embodiments, each respective set of one or more superblock 208 may only encode a single update to complete stream data 202. In a case where the size of complete stream data 202 or an update thereof is small (e.g., less than or equal to one SWS), writing this data to one superblock 208 results in a large amount of stranded capacity (e.g., >99% of the memory in the superblock 208 may not store useful data). Thus, in accordance with embodiments of the present disclosure, methods and systems are provided for reducing stranded capacity when storing one or more sets of small stream data (e.g., one or more updates to one or more corresponding and existing stream data) in one or more superblock 208.

Figure 3:
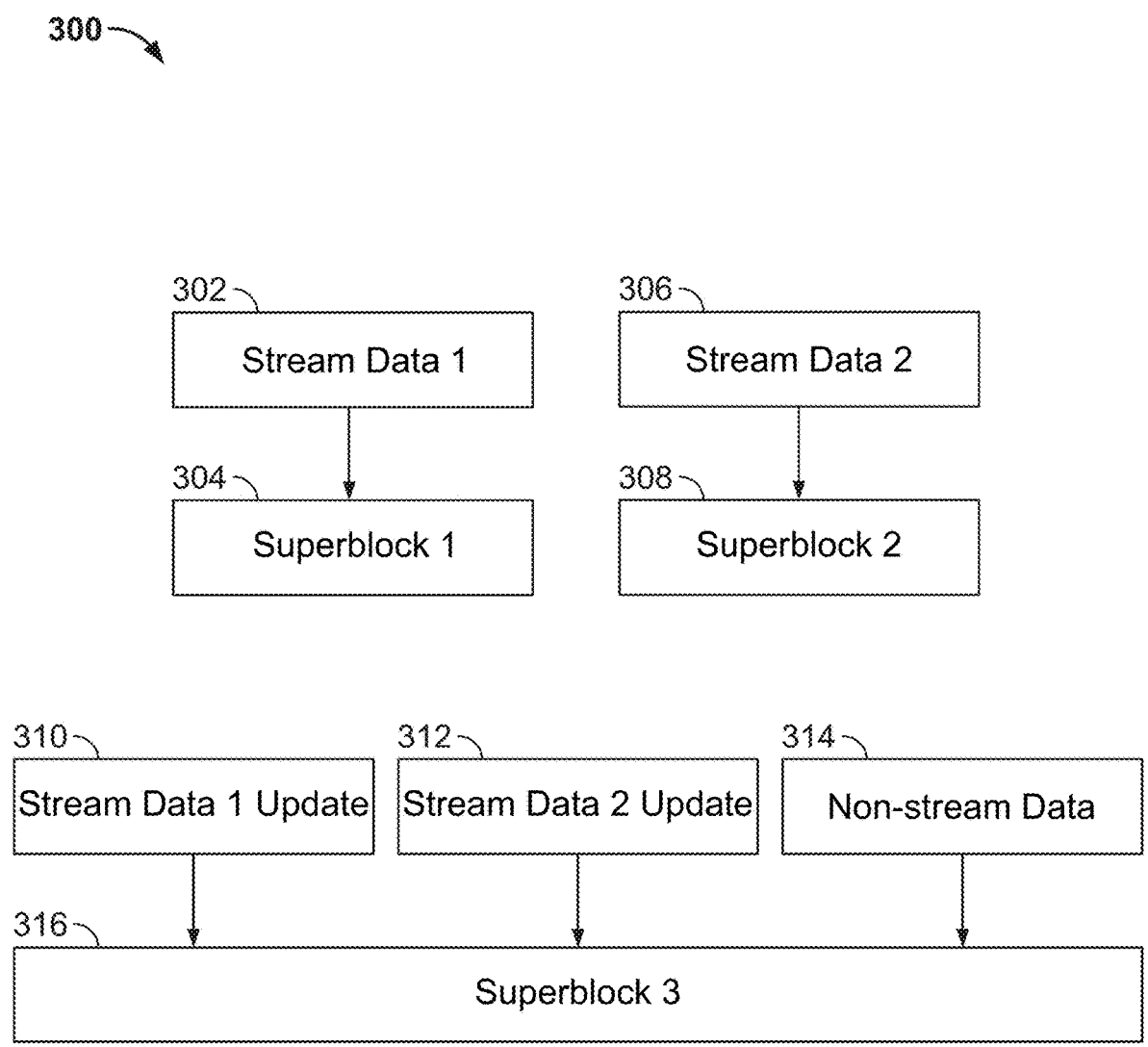
FIG. 3 shows a schematic representation of storing various stream data in various superblocks of memory, in accordance with some embodiments of the present disclosure.

FIG. 3 shows a schematic representation of storing various stream data in various superblocks (e.g., superblock 1 304, superblock 2 308, and superblock 3 316), in accordance with some embodiments of the present disclosure. Initially, stream data 1 302 and stream data 2 306 are respectively written to superblock 1 304 and superblock 2 308. In some embodiments, each superblock (e.g., superblock 1 304, superblock 2 308, and superblock 3 316) is included within memory 106. These write operations may each be associated with a respective stream ID, and they may or may not occur concurrently. After those initial write operations, for each of stream data 1 302 and stream data 2 306, data indicative of an update (e.g., data that modifies, trims, or appends at least a portion of the stream data) of at least one substream (e.g., an SWS) thereof (e.g., an update to stream data 1 302 and/or stream data 2 306) may be received. In response, any combination of stream data 1 update 310, stream data 2 update 312, or non-stream data 314 may be written to a shared superblock 3 316. As used herein, stream data update (i.e., updates 310, 312, or any other similar updates) may refer to data indicative of an update of a substream of stream data (i.e., streams 302, 306, or any other similar streams). For example, a stream data update may include an overwrite of an LBA associated with an existing stream data, or it may refer to writing a new LBA associated with an existing stream data. The existing stream data stored in memory and the corresponding stream data update (as is associated with the existing stream data) may share a respective stream ID. Stream data updates for a respective stream data may append or continue the respective stream data. Such updates may be characterized by the update frequency, e.g., based on the ratio of stream data 1 update 310 size to superblock 3 316 size. In some embodiments, such updates may include stream data and/or non-stream data.

Although two stream data and stream data updates are shown in FIG. 3, the methods and systems provided herein for updating stream data may apply to any suitable number of stream data and any suitable number of stream data updates that the storage device is capable of receiving, processing, and writing. Although the stream data and stream data updates are shown with a one-to-one correspondence in FIG. 3, they need not be in such a correspondence (i.e., there may be a greater number of stream data updates than stream data, and vice versa). For example, there may be two or more stream data updates for a single stream data.

In some embodiments (e.g., as per NVMe specifications), stream deallocation (e.g., deletion of stream data from a superblock) may be required for host 108 to incorporate a stream data update of an existing stream data stored in memory. Such a stream deallocation may occur in response to a directive send command (e.g., command 110). In the case of a small update frequency (e.g., 1-10%) of existing data stored in memory, an entire superblock (e.g., memory corresponding to an SGS) may be deallocated and the corresponding data of the SGS may be rewritten one or more times, which may lead to high WA, large stranded capacity, and/or high overprovisioning of memory.

Therefore, in some embodiments including as shown in FIG. 3, additional protocol specifications may exist to more efficiently write stream data updates. These additional specifications may reduce the frequency of stream deallocation, the quantity of stranded memory capacity, the WA associated with memory operations, or any combination thereof. These additional specifications may include commands 110 for concurrently storing multiple sets of data (i.e., stream data 1 update 310, stream data 2 update 312, and non-stream data 314) within one or more superblocks (i.e., superblock 3 316). Based on one or more identifiers (e.g., a stream ID and or LBA) of the discrete sets of data stored in discrete superblocks (e.g., superblock 1 304, superblock 2 308, or superblock 3 316), stream data updates (i.e., stream data 1 update 310 or stream data 2 update 312) may be reconciled with existing stream data (i.e., stream data 1 302 or stream data 2 306) stored in memory during subsequent read operations. In some embodiments, the respective sets of data stored in superblock 3 316 are not associated with each other. In some embodiments, reading any one or more respective sets of data from superblock 3 316 does not modify any of the other data stored in superblock 3 316.

The procedure illustrated in FIG. 3 may result in WA improvements when compared to that of other specifications (e.g., those of NVMe) for updating stream data. In some embodiments, including when non-stream data 314 is included in superblock 3 316, the WA incurred by the operations of FIG. 3 may be equal to: 1+(update frequency) *(WA of non-stream data), where the update frequency is based on the ratio of the total stream data update (e.g., including the sizes of stream data 1 update 310 and/or stream data 2 update 312) over the size of the superblock (e.g., superblock 3 316) to which the stream data update is written. In some embodiments, including when the update frequency is small (e.g., 1-10%), the resulting WA of FIG. 3 may be close to 1 and only limited by the WA caused by writing the non-stream data 314.

Figure 4:
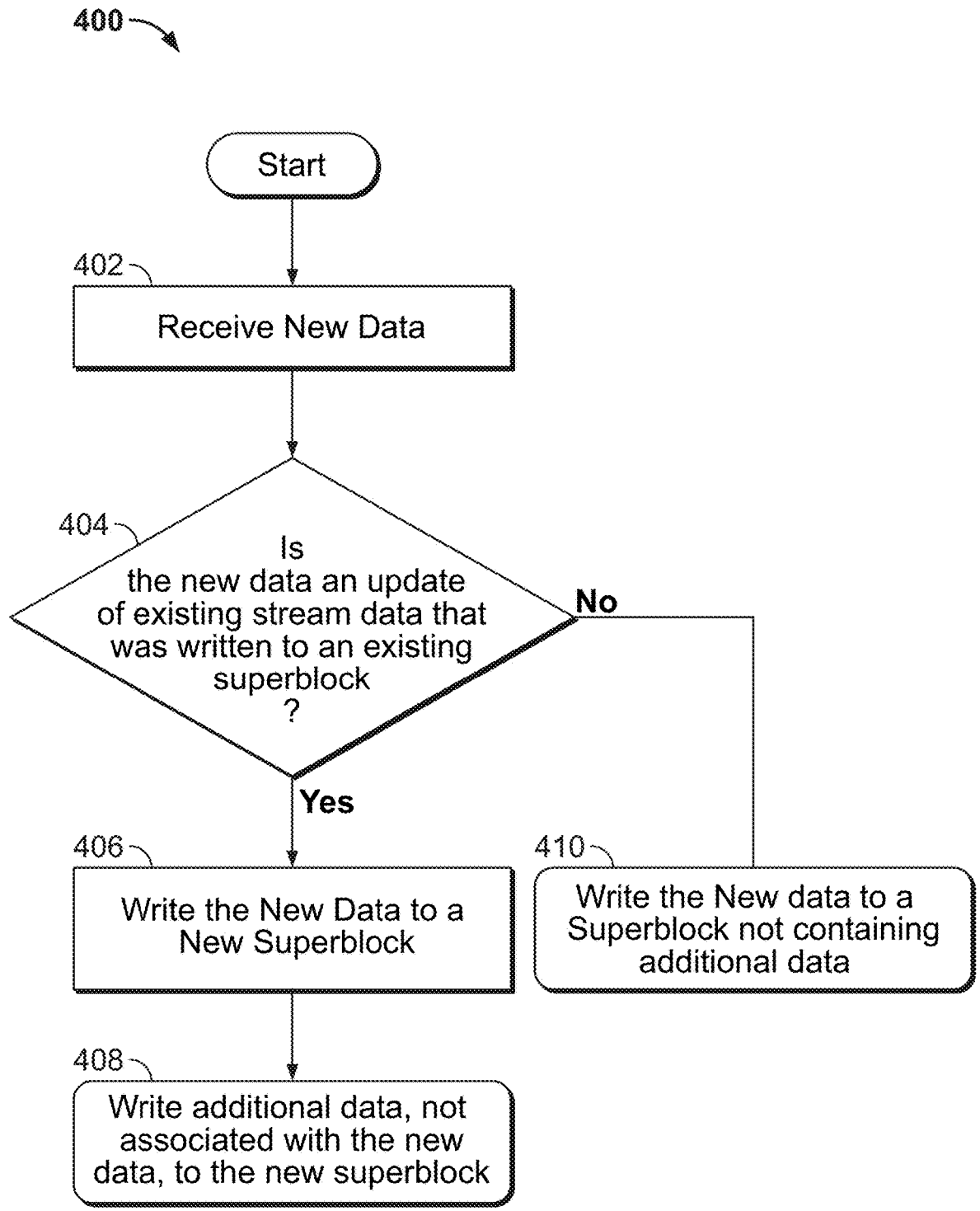
FIG. 4 shows a flowchart of illustrative steps for determining how to write data to a memory storage device, in accordance with some embodiments of the present disclosure.

FIG. 4 shows a flowchart of illustrative steps of process 400 for determining how to write data to a memory storage device, in accordance with some embodiments of the present disclosure. In some embodiments, the referenced new data may be complete stream data 202, stream data 1 302, stream data 2 306, stream data 1 update 310, or stream data 2 update 312. In some embodiments, the referenced existing stream data may be stream data 1 302 or stream data 2 306. In some embodiments, the referenced existing superblock may be superblock 1 304 or superblock 2 308. In some embodiments, the referenced new superblock may be superblock 3 316. In some embodiments, the referenced additional data may be stream data 1 update 310, stream data 2 update 312, or non-stream data 314, provided that the additional data is not the same data as the new data. In some embodiments, the referenced new and existing superblocks are discrete components of memory 106. In some embodiments, process 400 can be modified by, for example, having respective steps rearranged, changed, added, and/or removed.

At step 402, new data (e.g., complete stream data 202, stream data 1 302, stream data 1 update 310, or any other stream data) is received by storage device 102. In some embodiments, this new data may be received concurrently with other data (e.g., multiple stream data or multiple stream data updates may be received concurrently).

In response to receiving the new data, at step 404, storage device 102 and/or host 108 may determine whether the new data is an update of existing stream data that was written to an existing superblock. In some embodiments, storage device 102 and/or host 108 may independently evaluate each respective stream of concurrently received stream data or stream data updates to determine how to write each stream data or stream data update to one or more superblocks, as further explained below.

At step 406, if it was determined that the new data is an update of existing stream data, then host 108 may issue a command 110 to write the new data to a new superblock.

In response to a command to write the new data to a new superblock, at step 408, host 108 may issue a concurrent command 110 to write additional data, not associated with the new data, to the new superblock. In some embodiments, if multiple concurrently received data sets include multiple stream data updates, then these multiple stream data updates may all be written to the new superblock. For example, a first stream data update may be the new data identified at step 402, and one or more additional stream data updates may be the additional data identified at step 408, all of which may be concurrently written to the new superblock.

However, if at step 406 it was determined that the new data is not an update of existing stream data, then at step 410 host 108 may issue a command 110 to write the new data to one or more superblocks that do not contain additional data.

In some embodiments, each update of an existing stream data (e.g., as received at step 402) is no larger than a substream of the existing stream data and may be smaller than every respective substream of the existing stream data. In some embodiments, the flowchart of process 400 may be performed (e.g., on storage device 102 and/or host 108) in response to receiving one or more commands from a host device (e.g., host 108).

In some embodiments, process 400 also includes reading the new superblock, reading the existing superblock, and reconciling the respective data (i.e., the new data and the existing stream data) stored in the memory of the storage device. In some embodiments, these two or more respective data sets (e.g., a stream data and a corresponding stream data update) may be reconciled based on one or more stream IDs or LBAs associated with each respective data set. For example, the respective data sets may share a stream ID or follow a particular LBA mapping. In some embodiments, these two or more respective data sets may be reconciled without modifying any other data stored on the new superblock.

Figure 5:
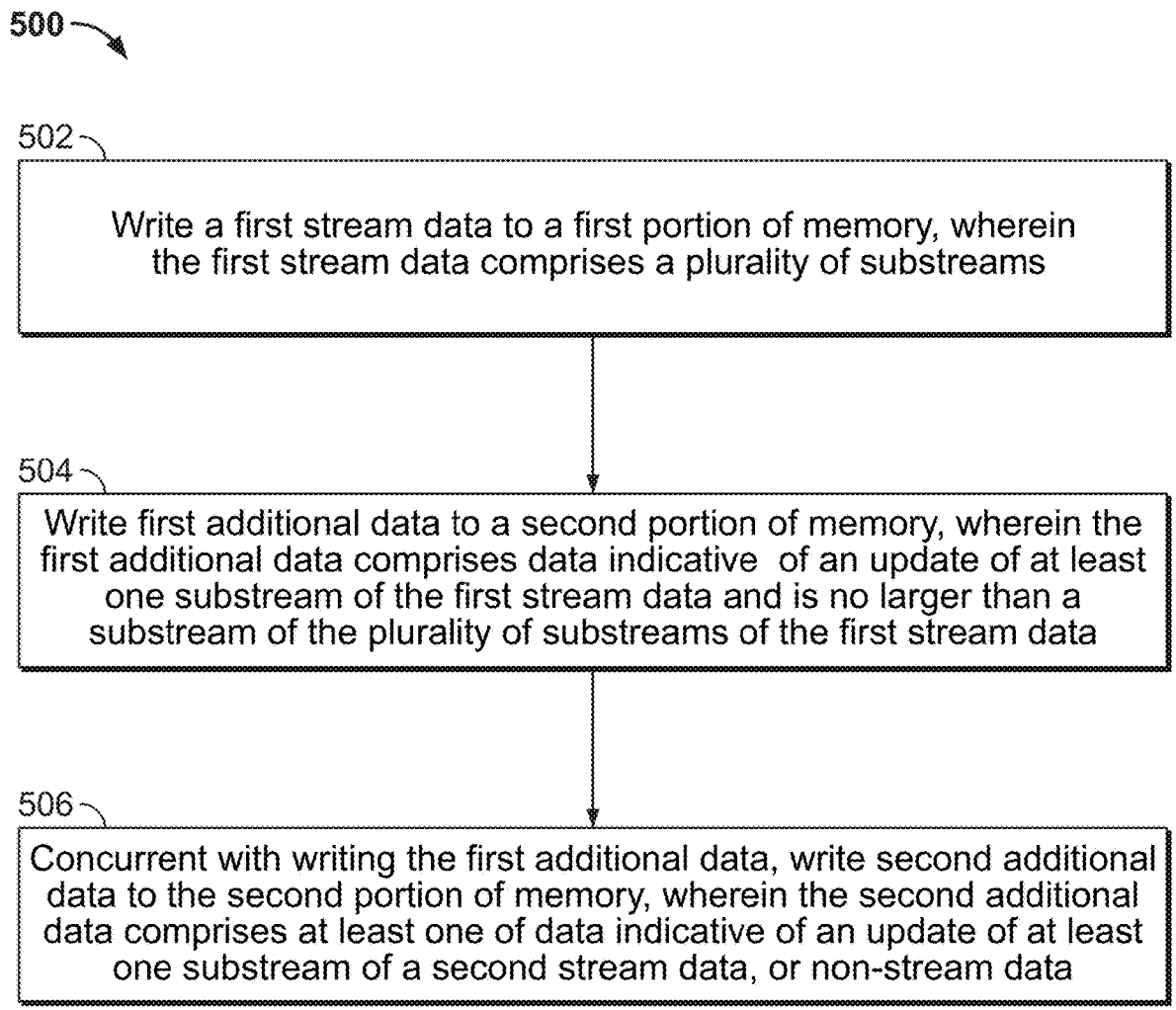
FIG. 5 shows a flowchart of illustrative steps for updating data stored in a memory storage device, in accordance with some embodiments of the present disclosure.

FIG. 5 shows a flowchart of illustrative steps of process 500 for updating data stored in a memory storage device, in accordance with some embodiments of the present disclosure. In some embodiments, the referenced first stream data, first portion of memory, plurality of substreams, first additional data, second portion of memory, second additional data, second stream data, and non-stream data may be stream data 1 302, superblock 1 304, a plurality of SWS 206, stream data 1 update 310, superblock 3 316, stream data 2 update 312, stream data 2 306, and non-stream data 314, respectively. In some embodiments, the referenced portions of memory are discrete components of memory 106. In some embodiments, process 500 can be modified by, for example, having respective steps rearranged, changed, added, and/or removed.

At step 502, a host (e.g., host 108) writes a first stream data to a first portion of memory (e.g., memory 106), wherein the first stream data includes a plurality of substreams. In some embodiments, the host concurrently writes additional streams of stream data, each of which may include a respective plurality of substreams, to additional portions of memory. In some embodiments, the first stream data is associated with a respective stream ID, and the first portion of memory is associated with a respective LBA. In some embodiments, each additional stream of data and each additional portion of memory may be respectively allocated a respective stream ID and a respective LBA.

At step 504, the host writes first additional data to a second portion of memory, wherein the first additional data includes data that updates at least one substream of the first stream data and is no larger than a substream of the plurality of substreams of the first stream of data. For example, the first additional data may include a new LBA or stream ID to associate with the first stream data or the first additional data may edit, append, continue, or otherwise update data of the first stream data. In some embodiments, the first additional data and the first stream data may share a respective stream ID.

At step 506, concurrent with writing the first additional data, the host writes second additional data to the second portion of memory, wherein the second additional data includes at least one of data indicative of an update of at least one substream of a second stream data or non-stream data. In some embodiments, the host receives multiple sets of data, determines that each such set of data updates an existing stream data stored in memory, and accordingly writes each one of the multiple sets of data to the second portion of memory. In some embodiments, the first additional data, second additional data, non-stream data, and any other additional data are each allocated a respective SWS within the second portion of memory. In some embodiments, the steps of process 500 further include compiling non-stream data to write into the second portion of memory.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments. Further, although process steps, method steps, algorithms or the like may be described in a sequential order, such processes, methods, and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

What is claimed is:

1. A method performed on a memory storage device for updating data stored in the memory storage device, the method comprising:
   writing a first stream data to a first portion of memory, wherein the first stream data comprises a plurality of substreams;
   writing first additional data to a second portion of memory, wherein the first additional data:
      comprises data indicative of an update of at least one substream of the first stream data, and
      is no larger than a substream of the plurality of substreams of the first stream data; and
   concurrent with writing the first additional data, writing second additional data to the second portion of memory, wherein the second additional data comprises data indicative of an update of at least one substream of a second stream data, wherein the second stream data is different than the first stream data, and non-stream data.

2. The method of claim 1, wherein the first additional data is smaller than every respective substream of the plurality of substreams of the first stream data.

3. The method of claim 1, further comprising:
   reading the first and second portions of memory; and
   reconciling the first stream data and the first additional data based on one or more stream IDs or logical block addresses associated with the first stream data and the first additional data, without modifying the second additional data stored in the second portion of memory.

4. The method of claim 1, wherein the second additional data comprises data indicative of an update of at least one substream of a second stream data, the method further comprising:
   writing the second stream data to a third portion of memory.

5. The method of claim 4, wherein the second additional data is no larger than a substream of a plurality of substreams of the second stream data.

6. The method of claim 5, further comprising:
   reading the second and third portions of memory; and
   reconciling the second stream data and the second additional data based on one or more stream IDs or logical block addresses associated with the second stream data and the second additional data, without modifying the first additional data stored in the second portion of memory.

7. The method of claim 1, further comprising performing the method of claim 1 in response to receiving one or more commands from a host device.

8. The method of claim 1, wherein each of the first portion of memory and the second portion of memory is an individually addressable erase unit.

9. A system comprising:
   a storage device, the storage device comprising memory and processing circuitry, wherein the processing circuitry is configured to:
      write a first stream data to a first portion of the memory, wherein the first stream data comprises a plurality of substreams;
      write first additional data to a second portion of the memory, wherein the first additional data:
         comprises data indicative of an update of at least one substream of the first stream data, and
         is no larger than a substream of the plurality of substreams of the first stream data; and
      concurrent with writing the first additional data, write second additional data to the second portion of the memory, wherein the second additional data comprises data indicative of an update of at least one substream of a second stream data, wherein the second stream data is different than the first stream data, and non-stream data.

10. The system of claim 9, wherein the processing circuitry is further configured to write first additional data that is smaller than every respective substream of the plurality of substreams of the first stream data.

11. The system of claim 9, wherein the processing circuitry is further configured to:
    read the first and second portions of the memory; and
    reconcile the first stream data and the first additional data based on one or more stream IDs or logical block addresses associated with the first stream data and the first additional data, without modifying the second additional data stored in the second portion of the memory.

12. The system of claim 9, wherein the second additional data comprises data indicative of an update of at least one substream of a second data stream, wherein the processing circuitry is further configured to:
    write the second stream data to a third portion of the memory.

13. The system of claim 12, wherein the processing circuitry is further configured to write second additional data that is no larger than a substream of a plurality of substreams of the second stream data.

14. The system of claim 13, wherein the processing circuitry is further configured to:
    read the second and third portions of the memory; and
    reconcile the second stream data and the second additional data based on one or more stream IDs or logical block addresses associated with the second stream data and the second additional data, without modifying the first additional data stored in the second portion of the memory.

15. The system of claim 9, further comprising a host device, wherein the processing circuitry is further configured to:
    receive one or more commands from the host device; and
    write at least one of the first stream data, the first additional data, or the second additional data in response to receiving the one or more commands.

16. The system of claim 9, wherein each of the first portion of memory and the second portion of memory is an individually addressable erase unit.

17. A non-transitory computer-readable medium having non-transitory computer-readable instructions encoded thereon that, when executed by processing circuitry, cause the processing circuitry to:
    write a first stream data to a first portion of memory, wherein the first stream data comprises a plurality of substreams;
    write first additional data to a second portion of memory, wherein the first additional data:
        comprises data indicative of an update of at least one substream of the first stream data, and
        is no larger than a substream of the plurality of substreams of the first stream data; and
    concurrent with writing the first additional data, write second additional data to the second portion of memory, wherein the second additional data comprises data indicative of an update of at least one substream of a second stream data, wherein the second stream data is different than the first stream data, and non-stream data.

18. The non-transitory computer-readable medium of claim 17, wherein the instructions further cause the processing circuitry to write first additional data that is smaller than every respective substream of the plurality of substreams of the first stream data.

19. The non-transitory computer-readable medium of claim 17, wherein the instructions further cause the processing circuitry to:
    read the first and second portions of memory; and
    reconcile the first stream data and the first additional data based on one or more stream IDs or logical block addresses associated with the first stream data and the first additional data, without modifying the second additional data stored in the second portion of memory.

20. The non-transitory computer-readable medium of claim 17, wherein the second additional data comprises data indicative of an update of at least one substream of a second stream data, wherein the instructions further cause the processing circuitry to:
    write the second stream data to a third portion of memory, wherein the second additional data is smaller than every respective substream of the plurality of substreams of the second stream data.

* * * * *